US007341971B2

(12) United States Patent
Denifl et al.

(10) Patent No.: US 7,341,971 B2
(45) Date of Patent: *Mar. 11, 2008

(54) PRODUCTION OF OLEFIN POLYMERIZATION CATALYSTS

(75) Inventors: Peter Denifl, Gries am Brenner (AT);
Erik Van Praet, Västra Frolunda (SE);
Michael Bartke, Järvenpää (FI);
Marita Oksman, Helsinki (FI); Marja Mustonen, Koskenkylän Saha (FI);
Thomas Garoff, Helsinki (FI); Kari Pesonen, Monninkylä (FI)

(73) Assignee: Borealis Technology OY, Porvoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/499,760

(22) PCT Filed: Dec. 18, 2002

(86) PCT No.: PCT/EP02/14461

§ 371 (c)(1),
(2), (4) Date: Oct. 20, 2004

(87) PCT Pub. No.: WO03/051934

PCT Pub. Date: Jun. 26, 2003

(65) Prior Publication Data

US 2005/0054518 A1 Mar. 10, 2005

(30) Foreign Application Priority Data

Dec. 19, 2001 (EP) .................................. 01660238

(51) Int. Cl.
*B01J 37/00* (2006.01)
*C08F 4/42* (2006.01)
(52) U.S. Cl. ...................... 502/102; 502/103; 502/117; 502/150; 502/152; 526/160; 526/170; 526/943
(58) Field of Classification Search ................ 502/103, 502/102, 117, 150, 152; 526/160, 170, 943
See application file for complete search history.

(56) References Cited

U.S. PATENT DOCUMENTS

| | | | | |
|---|---|---|---|---|
| 4,294,948 A | * | 10/1981 | Toyota et al. ............. | 526/124.8 |
| 4,517,307 A | * | 5/1985 | Cuffiani et al. ............ | 502/119 |
| 4,804,798 A | * | 2/1989 | Albizzati .................... | 585/512 |
| 4,845,177 A | * | 7/1989 | Vogt et al. ................. | 526/124.6 |
| 5,409,875 A | * | 4/1995 | Hsu et al. ................... | 502/109 |
| 5,413,979 A | * | 5/1995 | Kostiainen et al. ......... | 502/107 |
| 5,552,358 A | | 9/1996 | Speca | |
| 5,578,540 A | * | 11/1996 | Banzi et al. ................ | 502/115 |
| 5,648,309 A | * | 7/1997 | Bohm ......................... | 502/105 |
| 5,656,201 A | * | 8/1997 | Visca et al. .................... | 516/21 |
| 6,046,368 A | * | 4/2000 | Lamanna et al. ........... | 568/683 |
| 6,294,496 B1 | | 9/2001 | Diefenbach | |
| 6,790,919 B2 | * | 9/2004 | Matyjaszewski et al. ... | 526/171 |
| 6,815,390 B2 | * | 11/2004 | Vaughan et al. ............ | 502/150 |
| 6,881,698 B2 | * | 4/2005 | Bonnet et al. .............. | 502/162 |

FOREIGN PATENT DOCUMENTS

| | | |
|---|---|---|
| EP | 0 129 368 A1 | 12/1984 |
| EP | 0 255 790 A1 | 2/1988 |
| EP | 0255790 A1 * | 2/1988 |
| EP | 0 260 130 A1 | 3/1988 |
| EP | 0 279 863 A1 | 8/1988 |
| EP | 0 255 790 B1 | 10/1990 |
| EP | 0258089 B1 * | 10/1990 |
| EP | 0 426 646 A1 | 5/1991 |
| EP | 0 327 649 B1 | 7/1992 |
| EP | 0 519 236 A2 | 12/1992 |
| EP | 0 537 130 A1 | 4/1993 |
| EP | 0 426 646 B1 | 8/1995 |
| EP | 0 685 494 A1 | 12/1995 |
| EP | 000536840 B1 * | 12/1995 |
| EP | 0 537 130 B1 | 9/1996 |
| EP | 0 790 076 B1 | 8/1997 |
| EP | 0553806 B1 * | 5/1998 |
| EP | 0 423 101 B1 | 1/2000 |
| EP | 1 323 747 A1 | 7/2003 |
| WO | WO 94/28034 | 12/1994 |
| WO | WO 96/13529 | 5/1996 |
| WO | WO 97/10248 | 3/1997 |
| WO | WO 97/28170 | 8/1997 |
| WO | WO 98/37103 | 8/1998 |
| WO | WO 98/46616 | 10/1998 |
| WO | WO 98/49208 | 11/1998 |
| WO | WO 98/56831 | 12/1998 |
| WO | WO 99/10353 | 3/1999 |
| WO | WO 99/12981 | 3/1999 |
| WO | WO 99/19335 | 4/1999 |
| WO | WO 99/34341 | 7/1999 |
| WO | WO 99/41290 | 8/1999 |
| WO | 00/34341 | 6/2000 |
| WO | WO 0140146 A1 * | 6/2001 |
| WO | WO 01/70395 A2 | 9/2001 |
| WO | WO 02/060963 A1 | 8/2002 |

OTHER PUBLICATIONS

Cavazzini, M. et al., "Perfluorocarbon-Soluble Catalysts and Reagents and the Application of FBS (Fluorous Biphase System) to Organic Synthesis", Journal of Fluorine Chemistry, vol. 94 (1999), pp. 183-193.

(Continued)

*Primary Examiner*—David M Brunsman
(74) *Attorney, Agent, or Firm*—McDonnell Boehnen Hulbert & Berghoff LLP

(57) ABSTRACT

The invention provides a process for producing an olefin polymerization catalyst, comprising an organometallic compound of a transition metal or of an actinide or lanthanide, in the form of solid catalyst particles, comprising forming a liquid/liquid emulsion system which comprises a solution of one or more catalyst components dispersed in a solvent immiscible therewith; and solidifying said dispersed phase to convert said droplets to solid particles comprising the catalyst and optionally recovering said particles.

50 Claims, 2 Drawing Sheets

OTHER PUBLICATIONS

PCT International Search Report, PCT/EP02/14461, May 2, 2003.

Endres A. & Mass G., "Die fluorige Phase: Organische Chemie mit hochfluorierten Reagenzien under Losungsmittein", *Chemie in unserer Zeit* 34(6), 2000, 382-393.

Lo Nostro, Pierandrea, "Phase Separation Properties of Fluorocarbons, Hydrocarbons and Their Copolymers", *Advances in Colloid and Interface Science*, 56 (1995) 245-287.

Britovsek, George J.P. et al., "The Search for New-Generation Olefin Polymerization Catalysts: Life Beyond Metallocenes", *Angew. Chem. Int. Ed.*, 1999, 38, 428-447.

Bradley, D.C. et al., "Metallo-Organic Compounds Containing Metal-Nitrogen Bonds", *Canadian Journal of Chemistry*, vol. 40 (1962), 449-454.

Bradley, D.C. et al., "Metallo-Organic Compounds Containing Metal-Nitrogen Bonds. Part I. some Dialkylamino-Derivatives of Titanium and Zirconium", *Canadian Journal of Chemistry*, 1960, 3857-3861.

Chandra, G. et al., "Amido-Derivatives of Metals and Mettaloids, Part VI. Reactions of Titanium (IV), Zirconium (IV), AND Hafnium (IV) Amides with Protic Compounds", *J. Chem. Soc.* (A), 1968, 1940-1945.

Herrmann, Wolfgang A. et al., "The First Example of an *Ethylene*-Selective Soluble Ziegler Catalyst of the Zirconocene Class", *Angew. Chem. Int. Ed. Engl.* 28 (1989) No. 11, 1511-1512.

* cited by examiner

PRODUCTION OF OLEFIN POLYMERIZATION CATALYSTS

This application is a 371 filing of PCT/EP02/14461, filed 18 Dec. 2002.

This invention relates to a process for the production of catalysts for olefin polymerisation, and to their use in polymerising olefins.

BACKGROUND ART

Catalyst systems which are solutions of one or more catalyst components (e.g. a transition metal compound and optionally a cocatalyst) are known in the filed as homogeneous catalyst systems. Homogeneous systems are used as liquids in the polymerisation process. Such systems have in general a satisfactory catalytic activity, but their problem has been that the polymer thus produced has a poor morphology (e.g. the end polymer is in a form of a fluff having a low bulk density). As a consequence, operation of slurry and gas phase reactors using a homogeneous catalyst system cause problems in practice as i.a. fouling of the reactor can occur.

The above problems have been tried to overcome in several ways: The homogeneous system has been prepolymerised with an olefin monomer before the actual polymerisation step. Said prepolymerisation, however, has not solved the problem of the formation of a polymer fluff. EP 426 646 of Fina has further suggested to use specific prepolymerisation conditions, i.e. the reaction temperature and the reaction time of a narrow, specific range, for improving the morphology of the polymer thus obtained.

In WO 98 37103 the homogeneous catalyst system is introduced as droplets of a certain size into the polymerisation reactor for controlling the average particle size of a polyolefin produced in gas phase polymerisation. Said droplets are formed just before the introduction by using an atomizer (e.g. a spray nozzle).

Furthermore, to overcome the problems of the homogeneous systems in a non-solution process the catalyst components have been supported, e.g. their solution impregnated, on porous organic or inorganic support material, e.g. silica. These supported systems, known as heterogeneous catalyst systems, can additionally be prepolymerised in order to further immobilise and stabilise the catalyst components.

However, also supported and optionally prepolymerised systems present problems. It is difficult to get an even distribution of the catalyst components in the porous carrier material; and leaching of the catalyst components from the support can occur. Such drawbacks lead to an unsatisfactory polymerisation behaviour of the catalyst, and as a result the morphology of the polymer product thus obtained is also poor. Furthermore, the uneven distribution of the catalyst components in the support material can have an adverse influence on the fragmentation of the support material during the polymerisation step.

The support can also have an adverse effect on the activity of the catalyst, on its polymerisation behaviour and on the properties of the end polymer.

Accordingly, various measures have been proposed to improve the morphology properties of homogeneous catalyst systems. However, due to the complexity of the catalyst systems, the need still exists to develop further catalyst systems and preparation methods thereof which overcome the problems of the prior art practice.

SUMMARY OF THE INVENTION

The present invention provides a further method for preparing a solid catalyst for polyolefin polymerisation.

Another object of the invention is to provide an alternative method for producing solid spherical particles without supporting catalyst components to a porous support.

A further object is to provide a polymerisation process using the catalyst prepared according to the method of the invention, as well as a catalyst obtainable by the method of the invention.

DESCRIPTION OF THE INVENTION

Figure 1:
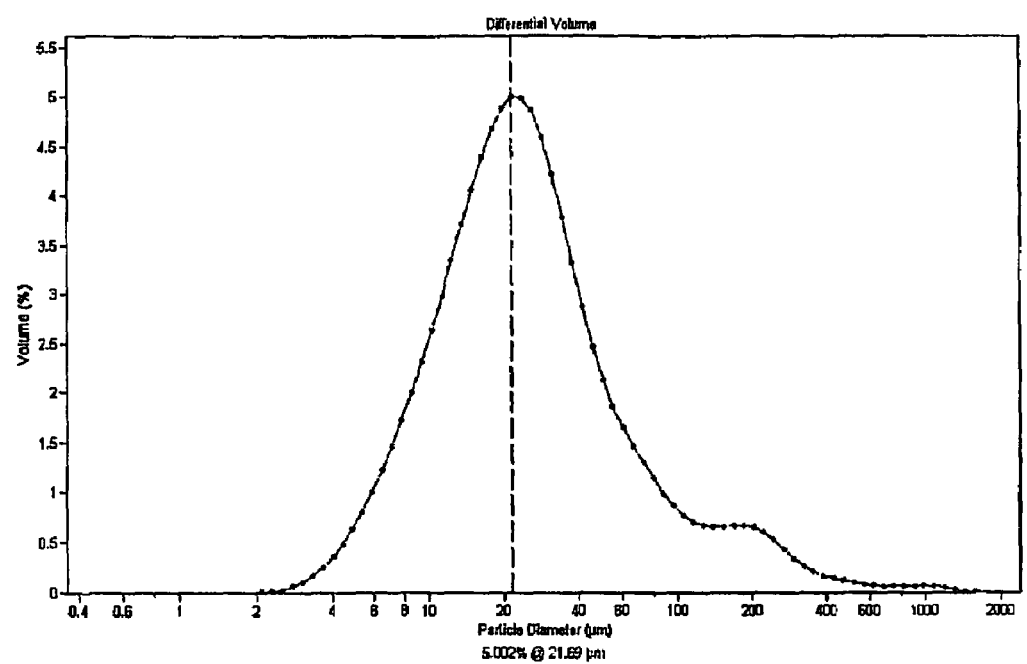
FIG. 1 shows the particle size distribution of catalyst particles according to the invention prepared in Example 1.

The invention is based on the finding that a homogeneous catalyst system containing an organometallic compound of a transition metal can be converted, in a controlled way, to solid, uniform catalyst particles by first forming a liquid/liquid emulsion system, which comprises as the dispersed phase, said solution of the homogeneous catalyst system, and as the continuous phase a solvent immiscible therewith, and then solidifying said dispersed droplets to form solid particles comprising the said catalyst.

The made invention enables for the first time to obtain solid spherical catalyst particles of said organotransition metal catalyst without using e.g. external porous carrier particles, such as silica, normally required in the prior art.

An uniform distribution of the chemical composition, both intra- and interparticles, can thus be obtained. Advantageously, the catalyst particles of the invention have a uniform catalytical behaviour in a polymerisation process. E.g. the catalyst can provide a uniform start-up of the polymerisation in a polymerisation process.

More specifically, the present invention provides a method for producing an olefin polymerisation catalyst, comprising an organometallic compound of a transition metal, in the form of solid catalyst particles, comprising preparing a solution of one or more catalyst components;

dispersing said solution in a solvent immiscible therewith to form an emulsion in which said one or more catalyst components are present in the droplets of the dispersed phase;

immobilising the catalyst components in the dispersed droplets, in the absence of an external particulate porous support, to form solid particles comprising the said catalyst, and optionally recovering said particles.

By the term "preparing a solution of one or more catalyst components" is naturally meant that the catalyst forming compounds may be combined in one solution which is dispersed to the immiscible solvent, or, alternatively, at least two separate catalyst solutions for each or part of the catalyst forming compounds may be prepared, which are then dispersed successively to the immiscible solvent.

In a preferable embodiment of the invention a solution of one or more catalyst components, comprising said transition metal compound and optionally a cocatalyst(s), is combined with an inert solvent immiscible therewith to form an emulsion wherein that solvent forms the continuous liquid phase and the solution comprising the catalyst component(s) is dispersed in the form of droplets (discontinuous phase). The droplets are then solidified to form solid catalyst particles, and the solid particles are separated from the liquid and optionally washed and/or dried.

The terms "immobilisation" and "solidification" are used herein interchangeably for the same purpose, i.e. for forming free flowing solid catalyst particles in the absence an external porous particulate carrier, such as silica. Said step can thus be effected in various ways: (i) by effecting a prepolymerisation reaction within the said droplets, (ii) by cross-linking, e.g. fully or partially cross-linking a catalyst component within the said droplets by adding cross-linking agent, (iii) by effecting a chemical reaction within the droplets whereby the reaction product precipitates ("solidifies"), and/or (iv) by causing an external stimulus to the emulsion system such as a temperature change to cause the solidification. Thus in said step the catalyst component(s) remain "fixed" within the formed solid particles. It is also possible that one or more of the catalyst components may take part in the solidification/immobilisation reaction.

Accordingly, solid, compositionally uniform particles having a predetermined particle size range are obtained.

Furthermore, the particle size of the catalyst particles of the invention can be controlled by the size of the droplets in the solution, and spherical particles with an uniform particle size distribution can be obtained.

The invention is also industrially advantageous, since it enables the preparation of the solid particles to be carried out as a one-pot procedure.

Dispersed Phase

The principles for preparing two phase emulsion systems are known in the chemical field. Thus, in order to form the two phase liquid system, the solution of the catalyst component(s) and the solvent used as the continuous liquid phase have to be essentially immiscible at least during the dispersing step. This can be achieved in a known manner e.g. by choosing said two liquids and/or the temperature of the dispersing step/solidifying step accordingly.

A solvent may be employed to form the solution of the catalyst component(s). Said solvent is chosen so that it dissolves said catalyst component(s). The solvent can be preferably an organic solvent such as used in the field, comprising an optionally substituted hydrocarbon such as linear or branched aliphatic, alicyclic or aromatic hydrocarbon, such as a linear or cyclic alkane or alkene, an aromatic hydrocarbon and/or a halogen containing hydrocarbon.

Examples of aromatic hydrocarbons are toluene, benzene, ethylbenzene, propylbenzene, butylbenzene and xylene. Toluene is a preferred solvent. The solution may comprise one or more solvents. Such an inert solvent can thus be used to facilitate the emulsion formation, and usually does not form part of the solidified particles, but e.g. is removed after the solidification step together with the continuous phase.

Alternatively, a solvent may take part to the solidification, e.g. an inert hydrocarbon having a high melting point (waxes), such as above 40° C., suitably above 70° C., e.g. above 80° C. or 90° C., may be used as solvents of the dispersed phase to immobilise the catalyst compounds within the formed droplets.

In another embodiment, the solvent consists partly or completely of a liquid monomer, e.g. liquid olefin monomer designed to be polymerised in a "prepolymerisation" immobilisation step.

Continuous Phase

The solvent used to form the continuous liquid phase is a single solvent or a mixture of different solvents and is immiscible with the solution of the catalyst component(s) at least at the conditions (e.g. temperatures) used during the dispersing step. Preferably said solvent is inert in relation to said compounds.

The term "inert in relation to said compounds" means herein that the solvent of the continuous phase is chemically inert, i.e. undergoes no chemical reaction with any catalyst forming component or catalyst precursor forming component. Thus, the solid particles of the catalyst or any precursor thereof are formed in the droplets from the compounds which originate from the dispersed phase, i.e. are provided to the emulsion in a solution dispersed into the continuous phase.

It is preferred that the catalyst component(s) used for forming the solid catalyst or catalyst component, as defined under "catalyst compounds" below, will not be soluble in the solvent of the continuous liquid phase. Preferably, said catalyst component(s) are essentially insoluble in said continuous phase forming solvent.

It was the basic finding of the inventors that the solidification takes place essentially after the droplets are formed, i.e. the solidification is effected within the droplets e.g. by causing a solidifying reaction among the compounds present in the droplets. Furthermore, even if some solidifying agent is added to the system separately, it reacts within the droplet phase as no catalyst forming components of the droplets go to the continuous phase to react there.

The term "emulsion" used herein covers both bi- and multiphasic systems.

This finding also applies to cases where the solvent is removed from the droplets (e.g. due to a temperature change) to cause the solidification of the active ingredients, whereby said solidifying ingredients remain essentially in a "droplet" form.

In a particularly preferred embodiment of the invention said solvent forming the continuous phase is an inert solvent and includes halogenated organic solvents, particularly fluorinated organic solvents, preferably semi, highly or perfluorinated organic solvents and functionalised derivatives thereof, which means that said solvents may contain other functional groups and/or further halogens such as chlorine.

Examples of the above-mentioned solvents are semi, highly or perfluorinated (a) hydrocarbons, such as alkanes, alkenes and cycloalkanes, (b) ethers, e.g. perfluorinated ethers and (c) amines, particularly tertiary amines, and functionalised derivatives thereof. Preferred are perfluorohydrocarbons of e.g. C3-C30, such as C4-C10. Specific examples of suitable perfluoroalkanes and -cycloalkanes include perfluorohexane, -heptane, -octane and -(methylcyclohexane). Semi fluorinated hydrocarbons relates particularly to semifluorinated n-alkanes, such as perfluoroalkylalkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. In this respect, it is referred to the articles of A. Enders and G. Maas in "Chemie in unserer Zeit", 34. Jahrg. 2000, Nr.6, and of Pierandrea Lo Nostro in "Advances in Colloid and Interface Science, 56 (1995) 245-287, Elsevier Science.

The fluorinated solvents are particularly preferred as they are unpolar, hydrophobic and have very limited miscibility with common organic solvents in certain temperature ranges.

Furthermore, these fluorinated solvents are chemically very inert and are very poor solvents for polar compounds such as catalytically active compounds and precursors or reaction products thereof. This finding of the inventors is very important in the formation of catalyst particles, because the reactive compounds can be kept within the droplet phase so that no relevant reactions in the continuous phase occur, which would worsen the morphology of the solidified catalyst particles.

Due to the above poor solvent properties, the "droplet form" of the catalyst components remains even if the solvent used initially in the catalyst solution is removed during solidification e.g. by heating the system.

The present invention is therefore also directed to the use of said fluorinated organic solvents or mixtures thereof for the preparation of an at least two-phase emulsion system for producing solid olefin polymerisation catalysts, wherein said at least two-phase emulsion system comprises continuous and dispersed phases and wherein said fluorinated organic solvent or mixtures thereof form the continuous phase of the emulsion.

Dispersing Step

The emulsion can be formed by any means known in the art: by mixing, such as by stirring said solution vigorously to said solvent forming the continuous phase or by means of mixing mills, or by means of ultra sonic wave. The mixing may be effected at lower or elevated temperatures, e.g. between 0 and 100° C., depending i.a. on the used solvents, and is chosen accordingly.

A further possibility is to use a so called phase change method for preparing the emulsion by first forming a homogeneous system which is then transferred by changing the temperature of the system to a at least biphasic system so that droplets will be formed. If needed, part of the catalyst forming compounds may be added after the emulsion system is formed.

The emulsion formation via said "one phase" change may be one preferable method, especially when e.g. fluorinated solvents are used as the continuous phase, since the miscibility of the fluorinated solvents, in particular perfluorinated solvents, with common organic solvents (e.g. alkane, such as pentane, hexane, chloroform, toluene) is dependent on the temperature so that a one phase system (homogeneous phase) of the fluorous solvent and a common organic solvent can be formed above a certain critical temperature.

The ratio of the first (e.g. fluorous solvent) and the second solvent (catalyst solution is chosen so that the first solution forms the discontinuous phase (droplets) in the at least two phase system.

The two phase state is maintained during the emulsion formation step and the solidification step, as for example, by appropriate stirring.

Additionally, emulsifying agents/emulsion stabilisers can be used, preferably in a manner known in the art, for facilitating the formation and/or stability of the emulsion. For the said purposes, surfactants, e.g. such as surfactants based on hydrocarbons (including polymeric hydrocarbons with a molecular weight e.g. up to 10 000, optionally interrupted with a heteroatom(s)), preferably halogenated hydrocarbons, such as semi-, or highly-fluorinated hydrocarbons optionally having a functional group, or, preferably semi-, highly- or perfluorinated hydrocarbons having a functionalised terminal, can be used.

Alternatively, an emulsifying and/or emulsion stabilising aid can also be formed by reacting a surfactant precursor bearing at least one functional group with a compound reactive with said functional group and present in the catalyst solution or in the solvent forming the continuous phase. The obtained reaction product acts as the actual emulsifying aid and/or stabiliser in the formed emulsion system. This embodiment is not bound to the present invention, but in principal can be used for forming any emulsion system, and also for preparing catalysts other than the present catalysts, e.g. catalysts of Ziegler Natta type.

Examples of the surfactant precursors usable for forming said reaction product include e.g. known surfactants which bear at least one functional group selected e.g. from —OH, —SH, —NH$_2$, —COOH, —COONH$_2$, and/or any reactive derivative of these groups, e.g. semi-, highly or perfluorinated hydrocarbons bearing one or more of said functional groups. Preferably, the surfactant precursor has a terminal functionality as defined above.

The compound reacting with such surfactant precursor is preferably contained in the catalyst solution and may be a further additive or one or more of the catalyst forming compounds, preferably other than the catalytically active transition metal compound (e.g. other than metallocene or non-metallocene). Such compound is preferably e.g. a coactivator, such as a compound of group 13, suitably an organoaluminium compound, such as an aluminium alkyl compound optionally comprising halogen or, preferably, in case of metallocenes, an aluminoxane compound (e.g. as known in the art).

The addition of the surfactant precursor may be effected e.g. before the dispersing step of the catalyst solution. However, the surfactant precursor may also be added to the formed emulsion system, whereby, preferably, the transition metal compound, e.g. a metallocene, is added to the dispersed phase after the formation of the reaction product of the surfactant precursor and said compound, e.g. a cocatalyst, of the emulsion system. After said reaction, if needed, the amount of said compound, e.g. a cocatalyst, in the catalyst solution may be increased with a further addition of the compound, either separately or e.g. together with the transition metal compound.

Preferably, the surfactant precursor is reacted with a compound of the catalyst solution before the addition of the transition metal compound. In a preferred embodiment a highly fluorinated $C_{1-30}$— (suitably $C_{4-20}$— or $C_{5-10}$—) alcohol (e.g. highly fluorinated heptanol, octanol or nonanol) is reacted with a cocatalyst, in the present invention preferably aluminoxane, present in the catalyst solution to form the "actual" surfactant. Then, an additional amount of cocatalyst and the transition metal compound, e.g. a metallocene, is added to said solution and the obtained solution is dispersed to the solvent forming the continuous phase. The "actual" surfactant solution may be prepared before the dispersing step or in the dispersed system. If said solution is made before the dispersing step, then the prepared "actual" surfactant solution and the transition metal solution may be dispersed successively (e.g. the surfactant solution first) to the immiscible solvent, or be combined together before the dispersing step.

The droplet size and size distribution of the formed discontinuous phase can be selected or controlled in a manner known in the art, i.a. by the choice of the device for emulsion formation and by the energy put into emulsification.

In the preparation process of the invention, the solution may already contain all the compounds (to be added) before the dispersing step thereof. Alternatively, e.g. depending on the reactivity of the compounds, the dispersed phase can be formed first from one or more of the compounds and, thereafter, the other compound(s) can be added separately to said dispersed phase. Said other compounds can be added in a form of a solution or already in a form of an emulsion. Portion-wise additions of the dispersed phase are also possible.

Additional agents and/or components can be added to the system in any stage of the dispersing and/or solidification step, if needed.

Catalyst Compounds

The term "catalyst component" as used herein includes, in addition to said transition metal compound, also any additional cocatalyst(s) (e.g. additional transition metal compounds and/or activators and/or poison scavengers) and/or any reaction product(s) of a transition compound(s) and a cocatalyst(s). Thus the catalyst may be formed in situ from the catalyst components in said solution in a manner known in the art.

It should also be understood that the catalyst prepared according to the invention may be used as such in the polymerisation process or may represent a "catalyst precursor" which is further activated or treated to form the active catalyst system. Furthermore, said catalyst of the invention may be part of a further catalyst system. These alternatives are within the knowledge of a skilled person.

The term "an organometallic compound of a transition metal" includes any metallocene or non-metallocene compound of a transition metal which bears at least one organic (coordination) ligand and exhibits the catalytic activity alone or together with a cocatalyst. The transition metal compounds are well known in the art and the present invention covers e.g. compounds of metals from Group 3 to 10, e.g. Group 3 to 7, or 3 to 6, such as Group 4 to 6 of the Periodic Table, (IUPAC, Nomenclature of Inorganic Chemistry, 1989), as well as lanthanides or actinides.

Accordingly, said organotransition metal compound may have the following formula I:

$$(L)_m R_n MX_q \qquad (I)$$

wherein M is a transition metal as defined above and each X is independently a monovalent anionic ligand, such as a σ-ligand, each L is independently an organic ligand which coordinates to M, R is a bridging group linking two ligands L, m is 1, 2 or 3, n is 0, 1 or 2, preferably 0 or 1, q is 1, 2 or 3, and m+q is equal to the valency of the metal.

In a more preferred definition, each L is independently (a) a substituted or unsubstituted cyclopentadiene or a mono-, bi- or multifused derivative of a cyclopentadiene which optionally bear further substituents and/or one or more hetero ring atoms from a Group 13 to 16 of the Periodic Table (IUPAC); or (b) an acyclic, $\eta^1$- to $\eta^4$- or $\eta^6$-ligand composed of atoms from Groups 13 to 16 of the Periodic Table, and in which the open chain ligand may be fused with one or two, preferably two, aromatic or non-aromatic rings and/or bear further substituents; or (c) a cyclic σ-, $\eta^1$- to $\eta^4$- or $\eta^6$-, mono-, bi- or multidentate ligand composed of unsubstituted or substituted mono-, bi- or multicyclic ring systems selected from aromatic or non-aromatic or partially saturated ring systems, and containing carbon ring atoms and optionally one or more heteroatoms selected from Groups 15 and 16 of the Periodic Table.

By "σ-ligand" is meant a group bonded to the metal at one or more places via a sigma bond.

According to a preferred embodiment said organotransition metal compound I is a group of compounds known as metallocenes. Said metallocenes bear at least one organic ligand, generally 1, 2 or 3, e.g. 1 or 2, which is η-bonded to the metal, e.g. a $\eta^{2-6}$-ligand, such as a $\eta^5$-ligand. Preferably, a metallocene is a Group 4 to 6 transition metal, suitably titanocene, zirconocene or hafnocene, which contains at least one $\eta^5$-ligand, which is e.g. an optionally substituted cyclopentadienyl, an optionally substituted indenyl, an optionally substituted tetrahydroindenyl or an optionally substituted fluorenyl.

The metallocene compound may have a formula II:

$$(Cp)_m R_n MX_q \qquad (II)$$

wherein:

each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being selected preferably from halogen, hydrocarbyl (e.g. C1-C20-alkyl, C2-C20-alkenyl, C2-C20-alkynyl, C3-C12-cycloalkyl, C6-C20-aryl or C7-C20-arylalkyl), C3-C12-cycloalkyl which contains 1, 2, 3 or 4 heteroatom(s) in the ring moiety, C6-C20-heteroaryl, C1-C20-haloalkyl, —SiR"$_3$, —OSiR"$_3$, —SR", —PR"$_2$ or —NR"$_2$, each R" is independently a hydrogen or hydrocarbyl, e.g. C1-C20-alkyl, C2-C20-alkenyl, C2-C20-alkynyl, C3-C12-cycloalkyl or C6-C20-aryl; or e.g. in case of —NR"$_2$, the two substituents R" can form a ring, e.g. five- or six-membered ring, together with the nitrogen atom wherein they are attached to;

R is a bridge of 1-7 atoms, e.g. a bridge of 1-4 C-atoms and 0-4 heteroatoms, wherein the heteroatom(s) can be e.g. Si, Ge and/or O atom(s), whereby each of the bridge atoms may bear independently substituents, such as C1-C20-alkyl, tri(C1-C20-alkyl)silyl, tri(C1-C20-alkyl)siloxy or C6-C20-aryl substituents); or a bridge of 1-3, e.g. one or two, hetero atoms, such as silicon, germanium and/or oxygen atom(s), e.g. —SiR$^1_2$—, wherein each R$^1$ is independently C1-C20-alkyl, C6-C20-aryl or tri(C1-C20-alkyl)silyl- residue, such as trimethylsilyl-;

M is a transition metal of Group 4 to 6, such as Group 4, e.g. Ti, Zr or Hf, each X is independently a sigma-ligand, such as H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —PR"$_3$, —SiR"$_3$, —OSiR"$_3$ or —NR"$_2$; each R" is independently hydrogen or hydrocarbyl, e.g. C1-C20-alkyl, C2-C20-alkenyl, C2-C20-alkynyl, C3-C12-cycloalkyl or C6-C20-aryl; or e.g. in case of —NR"$_2$, the two substituents R" can form a ring, e.g. five- or six-membered ring, together with the nitrogen atom wherein they are attached to;

and each of the above mentioned ring moiety alone or as a part of a moiety as the substituent for Cp, X, R" or R$^1$ can further be substituted e.g. with C1-C20-alkyl which may contain Si and/or O atoms;

n is 0, 1 or 2, e.g. 0 or 1, m is 1, 2 or 3, e.g. 1 or 2, q is 1, 2 or 3, e.g. 2 or 3, wherein m+q is equal to the valency of M.

Said metallocenes II and their preparation are well known in the art.

Cp is preferably cyclopentadienyl, indenyl, tetrahydroindenyl or fluorenyl, optionally substituted as defined above and may further bear a fused ring of 3 to 7 atoms, e.g. 4, 5 or 6, which ring may be aromatic or partially saturated.

In a suitable subgroup of the compounds of formula II, each Cp independently bears one or more substituents selected from C1-C20-alkyl, C6-C20-aryl, C7-C20-arylalkyl (wherein the aryl ring alone or as a part of a further moiety may further be substituted as indicated above), —OSiR"$_3$, wherein R" is as indicated above, preferably C1-C20-alkyl; X is as H, halogen, C1-C20-alkyl, C1-C20-alkoxy, C6-C20-aryl, C7-C20-arylalkenyl or —NR"$_2$ as defined above, e.g. —N(C1-C20-alkyl)$_2$; R is a methylene, ethylene or a silyl bridge, whereby the silyl can be substituted as defined above, e.g. a dimethylsilyl=, methylphenylsilyl= or trimethylsilylmethylsilyl=bridge; n is 0 or 1; m is 2 and q is two.

Preferably, R" is other than hydrogen.

A specific subgroup includes the well known metallocenes of Zr, Hf and Ti with one or two, e.g. two, $\eta^5$-ligands which may be bridged or unbridged cyclopentadienyl ligands optionally substituted with e.g. siloxy, alkyl and/or aryl as defined above, or with two unbridged or bridged indenyl ligands optionally substituted in any of the ring moieties with e.g. siloxy, alkyl and/or aryl as defined above, e.g. at 2-, 3-, 4- and/or 7-positions. As specific examples e.g. bis(alkylcyclopentadienyl)Zr (or Ti or Hf) dihalogenides can be mentioned, such as bis(n-butylcyclopentadienyl)ZrCl$_2$ and bis(n-butylcyclopentadienyl)HfCl$_2$, see e.g. EP-A-129 368. Examples of compounds wherein the metal atom bears a —NR"$_2$ ligand are disclosed i.a. in WO-A-9856831 and WO-A-0034341. The contents of the above documents are incorporated herein by reference. Further metallocenes are described e.g. in EP-A-260 130. As further examples of usable metallocenes may also be found e.g. from WO-A-9728170, WO-A-9846616, WO-A-9849208, WO-A-9912981, WO-A-9919335, WO-A-9856831, WO-A-00/34341, EP-A-423 101 and EP-A-537 130 as well as V. C. Gibson et al., in Angew. Chem. Int. Ed., engl., vol 38, 1999, pp 428-447, the disclosures of which are incorporated herein by reference.

Alternatively, in a further subgroup of the metallocene compounds, the metal bears a Cp group as defined above and additionally a $\eta^1$ or $\eta^2$ ligand, wherein said ligands may or may not be bridged to each other. This subgroup includes so called "scorpionate compounds" (with constrained geometry) in which the metal is complexed by a $\eta^5$ ligand bridged to a $\eta^1$ or $\eta^2$ ligand, preferably $\eta^1$ (for example a σ-bonded) ligand, e.g. a metal complex of a Cp group as defined above, e.g. a cyclopentadienyl group, which bears, via a bridge member, an acyclic or cyclic group containing at least one heteroatom, e.g. —NR"$_2$ as defined above. Such compounds are described e.g. in WO-A-9613529, the contents of which are incorporated herein by reference.

Any alkyl, alkenyl or alkynyl residue referred above alone or as a part of a moiety may be linear or branched, and contain preferably of up to 9, e.g. of up to 6, carbon atoms. Aryl is preferably phenyl or naphthalene. Halogen means F, Cl, Br or I, preferably Cl.

Another subgroup of the organotransition metal compounds of formula I usable in the present invention is known as non-metallocenes wherein the transition metal (preferably a Group 4 to 6 transition metal, suitably Ti, Zr or Hf) has a coordination ligand other than cyclopentadienyl ligand.

The term "non-metallocene" herein means compounds, which bear no cyclopentadienyl ligands or fused derivatives thereof, but one or more non-cyclopentadienyl η- or σ-, mono-, bi- or multidentate ligand. Such ligands can be chosen e.g. from (a) acyclic, $\eta^1$- to $\eta^4$- or $\eta^6$-ligands composed of atoms from Groups 13 to 16 of the Periodic Table (IUPAC), e.g. an acyclic pentadienyl ligand wherein the chain consists of carbon atoms and optionally one or more heteroatoms from Groups 13 to 16 (IUPAC), and in which the open chain ligand may be fused with one or two, preferably two, aromatic or non-aromatic rings and/or bear further substituents (see e.g. WO 01 70395, WO 97 10248 and WO 99 41290), or (b) cyclic σ-, $\eta^1$- to $\eta^4$- or $\eta^6$-, mono-, bi- or multidentate ligands composed of unsubstituted or substituted mono-, bi- or multicyclic ring systems, e.g. aromatic or non-aromatic or partially saturated ring systems, containing carbon ring atoms and optionally one or more heteroatoms selected from Groups 15 and 16 of the Periodic Table (IUPAC) (see e.g. WO 99 10353). Bi- or multidentate ring systems include also bridged ring systems wherein each ring is linked via a bridging group, e.g. via an atom from Groups 15 or 16 of the Periodic Table, e.g. N, O or S, to the transition metal atom (see e.g. WO 02 060963). As examples of such compounds, i.a. transition metal complexes with nitrogen-based, cyclic or acyclic aliphatic or aromatic ligands, e.g. such as those described in the applicant's earlier application WO-A-9910353 or in the Review of V. C. Gibson at al., in Angew. Chem. Int. Ed., engl., vol 38, 1999, pp 428-447 or with oxygen-based ligands, such as Group 4 metal complexes bearing bidentate cyclic or acyclic aliphatic or aromatic alkoxide ligands, e.g. optionally substituted, bridged bisphenolic ligands (see i.a. the above review of Gibson et al.). Further specific examples of non-$\eta^5$ ligands are amides, amide-diphosphane, amidinato, aminopyridinate, benzamidinate, azacycloalkenyl, such as triazabicycloalkenyl, allyl, beta-diketimate and aryloxide. The disclosures of the above documents are incorporated herein by reference. It should be noted that the diversity does not affect the applicability of the process of the invention, whose essential particle-shaping measures remain unaffected by the particular content of the particles to be shaped.

The preparation of metallocenes and non-metallocenes, and the organic ligands thereof, usable in the invention is well documented in the prior art, and reference is made e.g. to the above cited documents. Some of said compounds are also commercially available. Thus, said transition metal compounds can be prepared according to or analogously to the methods described in the literature, e.g. by first preparing the organic ligand moiety and then metallating said organic ligand (η-ligand) with a transition metal. Alternatively, a metal ion of an existing metallocene can be exchanged for another metal ion through transmetallation.

If several different transition metal compounds are used (mixed dual or multicatalyst systems), these can be any combinations of the above organometal compounds or of the above organometal compounds with other catalyst compounds (including Ziegler-Natta and chromium oxide systems), e.g. a combination at least of two or more metallocenes, of a metallocene and a non-metallocene, as well as of a metallocene and/or a non-metallocene with a Ziegler-Natta catalyst system (which comprises a transition metal compound and a compound of a metal from Group 2 of the Periodic Table, such as a Mg compound).

As stated above, the catalyst prepared according to the present invention may further comprise one or more cocatalysts well known in the art, preferably an activator containing aluminium or boron. Examples of such activators are organo aluminium compounds, such as trialkylaluminium compound and/or aluminoxane compound, or non-coordination ionic cocatalysts, such as boron activators.

Preferred as cocatalysts for metallocenes and non-metallocenes, if desired, are the aluminoxanes, in particular the C1-C10-alkylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. In this regard mention may be made particularly to boron compounds known in the art. Said activators are commercially available or can be prepared according to the prior art literature.

Further aluminoxane cocatalysts are described i.a. in WO-A-9428034 which is incorporated herein by reference. These are linear or cyclic oligomers of having up to 40, preferably 3 to 20, —(Al(R''')O)— repeat units (wherein R''' is hydrogen, C1-C10-alkyl (preferably methyl) or C6-C18-aryl or mixtures thereof).

The use and amounts of the such activators are within the skills of an expert in the field. As an example, with the boron activators, 5:1 to 1:5, preferably 2:1 to 1:2, such as 1:1, ratio of the transition metal to boron activator may be used. In case of aluminoxanes, such as methylaluminumoxane (MAO), the amount of Al, provided by aluminoxane, can be chosen to provide an Al:transition metal molar ratio e.g. in the range of 1:1 to 10 000:1, suitably 5:1 to 8000:1, preferably 10:1 to 7000:1, e.g. 100:1 to 4000:1, as normally used for homogeneous catalyst systems, or, depending on the used catalyst froming compounds, also 10:1 to 500:1, such as 100:1 to 300:1 as normally used for heterogeneous catalyst systems may be used.

The quantity of cocatalyst to be employed in the catalyst of the invention is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

Solidification Step

As stated above the immobilising/solidifying may be effected in many ways: One of the preferred embodiments is by polymerisation of an olefinic monomer present in said droplets. The olefinic monomer can conveniently be an alkene employed as solvent to form the solution of the catalyst component(s).

In a further embodiment of the invention prepolymerisation is effected by adding a monomer, in liquid or, preferably, in gaseous state to the emulsion. A catalytically active transition metal component or any other catalytically active compound, such as a peroxide, present in the droplets of the solution causes the monomers to polymerise within the droplets. The formed polymer matrix in turn causes the droplets to solidify. It is also possible to use a combination of the liquid and gaseous monomer(s) which may contain the same or different monomer.

The amount of monomer used may correspond to the amount of the solution.

The monomer used for prepolymerising the droplets of the at least two phase system can be any conventional gaseous or liquid monomer. When the solvent used to form the solution of the catalyst component(s) is not the solidifying monomer, a gaseous monomer is preferably used. As examples, olefin monomers each having 2 to 20 carbon atoms can be used. The olefin can be linear or branched, cyclic or acyclic, aromatic or aliphatic, including ethylene, propylene, 1-butene, 1-pentene, 2-methyl-1-butene, 3-methyl-1-butene, 1-hexene, 2-methyl-1-pentene, 3-methyl-1-pentene, 4-methyl-1-pentene, 2-ethyl-1-butene, 2,3-dimethyl-1-butene, 1-octene, styrene, vinylcyclohexane etc.

The monomer used for the prepolymerisation can be the same or different, preferably the same, to that used for the actual polymerisation step; also a comonomer can be used in the prepolymerisation step. The prepolymerisation conditions (temperature, time period etc.) can be chosen analogously to those described in the art, and will obviously avoid any risk of breaking the emulsion which defines the droplets. In case a liquid monomer is used as solution for the catalyst components, the actual prepolymerisation reaction/immobilisation step can be initiated and controlled e.g. by the temperature.

In general the monomer is used in amounts sufficient to cause the precipitation of the formed prepolymer, i.e. the formation of a solid prepolymer matrix, within the droplets, whereby solid polymeric particles with uniform size are obtained containing the catalyst component(s) fixed to the matrix. The size of the formed particles can be controlled by the droplet size of the dispersed phase, the catalyst concentration in the solution, the used amount of the monomer and/or the prepolymerisation conditions (time, temperature etc).

The principles of prepolymerisation as described e.g. in EP-A-279 863, the contents of which are incorporated herein by a reference, can be used. Furthermore, in general, e.g. a gaseous monomer feed may be diluted with nitrogen or other inert gas. Also a hydrogen can be used in a known manner during the prepolymerisation to control molecular weight of the prepolymer.

Alternatively, the solidifying may be effected by inducing within the droplets a chemical reaction between two or more reactants which yields a solid product containing the catalyst. The induction can be achieved by adding a reactant(s) and/or by changing the temperature. Moreover the solidification may be effected by cross-linking said activator with a cross-linking agent. E.g. the cross-linking of an aluminoxane, such as MAO, can be effected in a known manner using the principles described e.g. EP-A-685 494, the contents of which are incorporated herein by reference.

In a particularly preferred embodiment, the solidification is effected after the emulsion system is formed by subjecting the system to an external stimulus, such as a temperature change. Temperature differences of e.g. 5 to 100° C., such as 10 to 100° C., or 20 to 90° C., such as 50 to 80° C., e.g. 70 to 80° C. can be used.

The emulsion system may be subjected to a rapid temperature change to cause a fast solidification in the dispersed system. The dispersed phase may e.g. be subjected to an immediate (within milliseconds to few seconds) temperature change in order to achieve an instant solidification of the component(s) within the droplets. The appropriate temperature change, i.e. an increase or a decrease in the temperature of an emulsion system, required for the desired solidification rate of the components cannot be limited to any specific range, but naturally depends on the emulsion system, i.a. on the used compounds and the concentrations/ratios thereof, as well as on the used solvents, and is chosen accordingly. It is also evident that any techniques may be used to provide sufficient heating or cooling effect to the dispersed system to cause the desired solidification.

In one embodiment the heating or cooling effect is obtained by bringing the emulsion system with a certain temperature to an inert receiving medium with significantly different temperature, e.g. as stated above, whereby said temperature change of the emulsion system is sufficient to cause the rapid solidification of the droplets. The receiving medium can be gaseous, e.g. air, or a liquid, preferably a solvent, or a mixture of two or more solvents, wherein the catalyst component(s) is(are) immiscible and which is inert in relation to the catalyst component(s). For instance, the receiving medium comprises the same immiscible solvent used as the continuous phase in the first emulsion formation step. Said solvents can be used alone or as a mixture with other solvents, such as aliphatic or aromatic hydrocarbons, such as alkanes. Preferably a fluorinated solvent as the receiving medium is used, which may be the same as the continuous phase in the emulsion formation, e.g. perfluorinated hydrocarbon.

Alternatively, the temperature difference may be effected by gradual heating of the emulsion system, e.g. up to 10° C. per minute, preferably 0.5 to 6° C. per minute and more preferably in 1 to 5° C. per minute.

In case a melt of e.g. a hydrocarbon solvent is used for forming the dispersed phase, the solidifcation of the droplets may be effected by cooling the system using the temperature difference stated above.

Preferably, the "one phase" change as usable for forming an emulsion can also be utilised for solidifying the catalytically active contents within the droplets of an emulsion system by, again, effecting a temperature change in the dispersed system, whereby the solvent used in the droplets becomes miscible with the continuous phase, preferably a fluorous continuous phase as defined above, so that the droplets become impoverished of the solvent and the solidifying components remaining in the "droplets" start to solidify. Thus the immisciblity can be adjusted with respect to the solvents and conditions (temperature) to control the solidification step.

The miscibility of e.g. fluorous solvents with organic solvents can be found from the literature and be chosen accordingly by a skilled person. Also the critical temperatures needed for the phase change are available from the literature or can be determined using methods known in the art, e.g. the Hildebrand-Scatchard-Theorie. Reference is also made to the articles of A. Enders and G. and of Pierandrea Lo Nostro cited above.

Thus according to the invention, the entire or only part of the droplet may be converted to a solid form. The size of the "solidified" droplet may be smaller or greater than that of the original droplet, e.g. if the amount of the monomer used for the prepolymerisation is relatively large.

The solid catalyst particles recovered can be used, after an optional washing step, in a polymerisation process of an olefin. Alternatively, the separated and optionally washed solid particles can be dried to remove any solvent present in the particles before use in the polymerisation step. The separation and optional washing steps can be effected in a known manner, e.g. by filtration and subsequent washing of the solids with a suitable solvent.

The solid particles obtained may have an average size range of 1 to 500 μm, particularly 5 to 500 μm, advantageously 5 to 200 μm, e.g. 10 to 100 μm, or even 5 to 50 μm, all sizes of which may be usable, depending on the polymerisation the catalyst is used for. As stated above, the size can be determined i.a. by the amount of the immobilising agent, e.g. monomer, used in the method.

The present method enables to prepare catalyst particles with high catalytic activity. Preferably, the present catalyst particles have also very low porosity and a low surface area, e.g. of less than 50 $m^2/g$, preferably less than 30 $m^2/g$ and more preferably less than 20 $m^2/g$.

Polymerisation Process

The catalyst system of the invention can then be used alone or together with an additional cocatalyst(s) in the actual polymerisation step in a manner known in the art.

The olefin to be polymerised using the catalyst system of the invention can be any olefin polymerisable in a coordination polymerisation including an alpha-olefin alone or as a mixture with one or more comonomers. Preferable olefins are ethylene or propene, or a mixture of ethylene or propene with one or more alpha-olefin(s). Preferable comonomers are C2-C12-olefins, preferably C4-C10-olefins, such as 1-butene, isobutene, 1-pentene, 1-hexene, 4-methyl-1-pentene, 1-heptene, 1-octene, 1-nonene, 1-decene, as well as diene, such as butadiene, 1,7-octadiene and 1,4-hexadiene, or cyclic olefins, such as norbornene, and any mixtures thereof.

Polyethene and any copolymers thereof are particularly contemplated, as are polypropylene homopolymers and any copolymers thereof.

Furthermore, the catalyst system of the invention can be used for the polymerisation of long chain branched alpha-olefins (with 4 to 40 C atoms), alone or together with short chain branched alpha-olefins.

Polymerisation may be effected in one or more, e.g. one, two or three polymerisation reactors, using conventional polymerisation techniques, in particular gas phase, solution phase, slurry or bulk polymerisation. Polymerisation can be a batch or continuous polymerisation process. Generally a combination of slurry (or bulk) and at least one gas phase reactor is preferred, particularly with gas phase operation coming last.

For slurry reactors, the reaction temperature will generally be in the range of 60 to 110° C. (e.g. 85-110° C.), the reactor pressure will generally be in the range 5 to 80 bar (e.g. 50-60 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerisation may, if desired, be effected under supercritical conditions.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or propane together with monomer (e.g. ethylene or propylene).

Generally the quantity of catalyst used will depend upon the nature of the catalyst, the reactor types and conditions and the properties desired for the polymer product. Conventional catalyst quantities, such as described in the publications referred herein, may be used.

With the method of the invention a catalyst system with a high bulk density and a good morphology is obtained and the catalyst exhibits a high catalytic activity. The bulk density and morphology correlate with product bulk density and morphology—the so-called "replica effect". Thus the catalyst leads to a polymer with a higher bulk density than obtained with homogeneous systems of the prior art, without using an external support material. Accordingly, the catalyst of the method of the invention combines the advantages of the prior art homogeneous and heterogeneous catalyst systems.

EXAMPLES

The following examples are provided by way of illustration of the invention. The starting materials, reagents and solvents used are commerically available, or can be prepared according to or analogously to the methods described in the prior art literature.

Example 1

Complex Preparation 49.3 mg of bis(n-butyl-cyclopentadienyl)zirconium dichloride (Eurocen 5031, Witco GmbH) were reacted with 4 ml MAO solution, 30 wt-% in toluene (Albemarle) under stirring at room temperature in a septa bottle for 30 minutes. A yellow solution of activated complex (with target Al/Zr=200) was obtained.

Surfactant Preparation 284 mg of 2,2,3,3,4,4,5,5,6,6,7,7-dodecafluoroheptanol (Apollo Scientific, UK) were added slowly to 0.5 ml MAO under stirring. A heavy reaction with liberation of gas occours. Afterwards, additional 0.5 ml of MAO were added to the solution. No visible reaction was observed.

Emulsion Formation 20 ml of dried perfluorooctane (98%, P & M Invest, Moscow, Russia) were bubbled with nitrogen for 15 minutes (to remove oxygen traces) and filled into a 50 ml glass reactor with four baffles and an anchor-type stirrer. The above-mentioned activated complex solution and the above-mentioned surfactant were added successively. A liquid-liquid two-phase system was formed. The mixture was stirred for 10 minutes with 500 rpm under cooling in an ice bath. A milky emulsion was formed.

Solidification 60 ml of dried perfluorooctane (P & M Invest, Moscow, Russia) were bubbled with nitrogen for 15 minutes (to remove oxygen traces) and filled into a 200 ml glass reactor equipped with an anchor-type stirrer. The reactor is heated up to 90° C. in an oil bath and stirred with 300 rpm. Then the above-mentioned emulsion is transferred via an teflon tube and (nitrogen-) overpressure into the hot perfluorooctane. Solid particles are formed immediately.

Isolation

The stirring is ceased, and the reactor cooled down. The liquid is siphoned out of the reactor, and the remaining catalyst is dried for one hour at 50° C. in a nitrogen flow. Then the reactor is introduced into the glove box and the dried catalyst is taken out and weighted.

Catalyst Characterization

The catalyst composition is analyzed via elementary anlysis, the Al-content is 27.8 wt-%, the Zr-content is 0.42 wt-%. The average particle diameter (analyzed via Coulter counter) is 22 μm. The particle size distribution is shown in FIG. 1.

Figure 2:
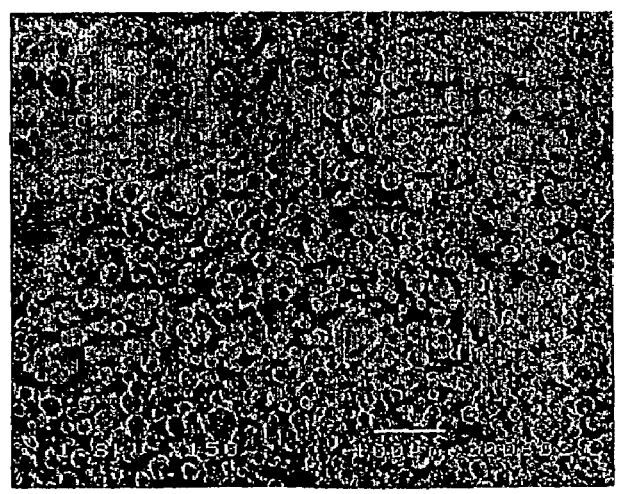
FIG. 2 illustrates the nearly perfect spherical shape of catalyst particles according to the invention prepared in Example 1.

The specific surface of the catalyst, analyzed via nitrogen-adsorption (BET-method) is 14 $m^2/g$. The catalyst particles have a nearly perfect spherical shape as shown in FIG. 2.

Test Polymerization

The polymerizations were performed in a 3 l stainless steel autoclave reactor equipped with a paddle stirrer. 1 l dried and deoxygenated i-butane used as medium was charged to the reactor, which was beforehand dried at +100° C. in vacuum and then purged with nitrogen. 16.6 mg of catalyst was weighed into a metal cylinder in the glove box. Then the catalyst cylinder was connected to the reactor and the catalyst was added to the reactor with 0.8 l i-butane (Messer Griesheim). The reactor was heated up to +80° C. and then ethylene (Borealis polymerisation grade) was introduced to the reactor. The total pressure was adjusted to have 5 bar ethylene partial pressure in the reactor. Continuous flow of ethylene kept the total pressure constant. Comonomer (40 ml of 1-hexene, Borealis polymerisation grade) was fed to the reactor simultaneously with ethylene. The polymerization was continued for 60 min and after that the polymerization was stopped.

The formed polymer was weighted and the activity was calculated to be 9.04 kg PE/g cat./h.

Example 2

Complex Preparation 40.8 mg of bis(n-butylcyclopentadienyl)zirconium dichloride (Eurocen 5031, Witco GmbH) was reacted with 4 ml MAO (30 wt-% in toluene, Albemarle) under stirring at room temperature in a septabottle for 30 minutes. A yellow solution of activated complex (with target Al/Zr=200) was obtained.

Surfactant Preparation 195 mg of 2,2,3,3,4,4,5,5,6,6,7,7,8,8,9,9,9-heptadecafluoro-1-nonanol (Apollo Scientific, UK) was added slowly to 0.5 ml MAO under stirring. A heavy reaction with liberation of gas occurred. Afterwards, additional 0.5 ml of MAO was added to the solution. No visible reaction was observed.

Emulsion Formation 20 ml of dried perfluorooctane (98%, P & M Invest, Moscow, Russia) was bubbled with nitrogen for 15 minutes (to remove oxygen traces) and filled into 50 ml glass reactor with four baffles and an anchor-type stirrer. The above-mentioned activated complex solution and the above-mentioned surfactant are added successively. A liquid-liquid two-phase system is formed. The mixture is stirred for 10 minutes with 500 rpm under cooling in an ice bath. A milky emulsion is formed.

Solidification 60 ml of dried perfluorooctane (98%, P & M Invest, Moscow, Russia) was bubbled with nitrogen for 15 minutes (to remove oxygen traces) and filled into 200 ml glass reactor with four an anchor-type stirrer. The reactor was heated up to 90° C. in an oil bath and stirred with 300 rpm. Then the above-mentioned emulsion was transferred via a teflon tube and (nitrogen-) overpressure into the hot perfluorooctane. Solid particles were formed immediately.

Isolation

The stirring is ceased and the reactor cooled down. The liquid was siphoned out of the reactor and the remaining catalyst is dried for one hour at 50° C. in a nitrogen flow. Then the reactor was taken out and weighted.

Example 3

Complex Preparation 42.9 mg of bis(n-butylcyclopentadienyl)zirconium dichloride (Eurocen 5031, Witco GmbH) was reacted with 4 ml MAO (30 wt-% in toluene, Albemarle) under stirring at room temperature in a septabottle for 30 minutes. A yellow solution of activated complex (with target Al/Zr=200) was obtained.

Surfactant Preparation 168 mg of 2,2,3,3,4,4,5,5,6,6,7,7-dodecafluoroheptanol (Apollo Scientific, UK) was added slowly to 0.5 ml MAO under stirring. A heavy reaction with liberation of gas occurred. Afterwards, additional 0.5 ml of MAO was added to the solution. No visible reaction was observed.

Emulsion Formation 20 ml of dried perfluorooctane (98%, P & M Invest, Moscow, Russia) was bubbled with nitrogen for 15 minutes (to remove oxygen traces) and filled into 50 ml glass reactor with four baffles and an anchor-type stirrer. The above-mentioned activated complex solution and the above-mentioned surfactant are added successively. A liquid-liquid two-phase system is formed. The mixture is stirred for 10 minutes with 500 rpm under cooling in an ice bath. A milky emulsion is formed.

Solidification 60 ml of dried perfluorooctane (98%, P & M Invest, Moscow, Russia) was bubbled with nitrogen for 15 minutes (to remove oxygen traces) and filled into 200 ml glass reactor with four an anchor-type stirrer. The reactor was heated up to 50° C. in an oil bath and stirred with 300 rpm. Then the above-mentioned emulsion was transferred via a teflon tube and (nitrogen-) overpressure into the hot perfluorooctane. Solid particles were formed immediately.

Example 4

Complex Preparation 80.3 mg of bis(n-butylcyclopentadienyl)hafnium dichloride (TA02823, Witco GmbH) was reacted with 4 ml MAO (30 wt-% in toluene, Albemarle) under stirring at room temperature in a septabottle for 30 minutes. A yellow solution of activated complex (with target Al/Hf=200) was obtained.

Surfactant Preparation 455 mg of 2,2,3,3,4,4,5,5,6,6,7,7-dodecafluoroheptanol (Apollo Scientific, UK) was added slowly to 1.0 ml MAO under stirring. A heavy reaction with liberation of gas occurred. Afterwards, additional 1.0 ml of MAO was added to the solution. No visible reaction was observed.

Emulsion Formation 20 ml of dried perfluorooctane (98%, P & M Invest, Moscow, Russia) was bubbled with nitrogen for 15 minutes (to remove oxygen traces) and filled into 50 ml glass reactor with four baffles and an anchor-type stirrer. The above-mentioned activated complex solution and the above-mentioned surfactant are added successively. A liquid-liquid two-phase system is formed. The mixture is stirred for 10 minutes with 500 rpm under cooling in an ice bath. A milky emulsion is formed.

Solidification 60 ml of dried perfluorooctane (98%, P & M Invest, Moscow, Russia) was bubbled with nitrogen for 15 minutes (to remove oxygen traces) and filled into 200 ml glass reactor with four an anchor-type stirrer. The reactor was heated up to 50° C. in an oil bath and stirred with 300 rpm. Then the above-mentioned emulsion was transferred via a teflon tube and (nitrogen-) overpressure into the hot perfluorooctane. Solid particles were formed immediately.

Example 5

Complex Preparation 54.2 mg of rac-Me$_2$Si(2-Me-4-PhInd)$_2$ZrCl$_2$ (CATALYTICA ADVANCED TECHNOLOGIES) were reacted with 4 ml MAO solution, 30%-wt. in toluene (Albemarle) under stirring at room temperature in a septa bottle for 30 minutes. A yellow solution of activated complex with (target Al/Zr=250) was obtained.

Surfactant Preparation 0.1 ml of 2,2,3,3,4,4,5,5,6,6,7,7-Dodecafluoroheptanol (Appollo Scientific, UK) were added slowly to 0.5 ml MAO under stirring. A heavy reaction with liberation of gas occours. Afterwards, additional 0.5 ml of MAO were added to the solution. No visible reaction was observed.

Emulsion Formation 20 ml of dried perfluorooctane (98%, P & M Invest, Moscow, Russia), were bubbled with nitrogen for 15 minutes (to remove oxygen traces) and filled into a 50 ml glass reactor with four baffles and an anchor-type stirrer.

The under 1) described activated complex solution and the under 2) described surfactant are added successively. A liquid-liquid two-phase systems is formed. The mixture is stirred for 10 minutes with 500 rpm under cooling in an ice bath. A milky emulsion is formed.

Solidification 60 ml of dried perfluorooctane (P & M Invest, Moscow, Russia), were bubbled with nitrogen for 15 minutes (to remove oxygen traces) and filled into a 200 ml glass reactor equipped with an anchor-type stirrer. The reactor is heated up to 90° C. in an oil bath and stirred with 300 rpm. Then the under 3) formed emulsion is transferred via an Teflon tube and (nitrogen-) overpressure into the hot perfluorooctane. Solid particles are formed immediately.

Isolation

The stirring is ceased, and the reactor cooled down. The liquid is siphoned out of the reactor, and the remaining catalyst is dried for one hour at 50° C. in a nitrogen flow. Then the reactor is introduced into the glove box and the dried catalyst is taken out and weighted.

Catalyst Characterisation

Figure 3:
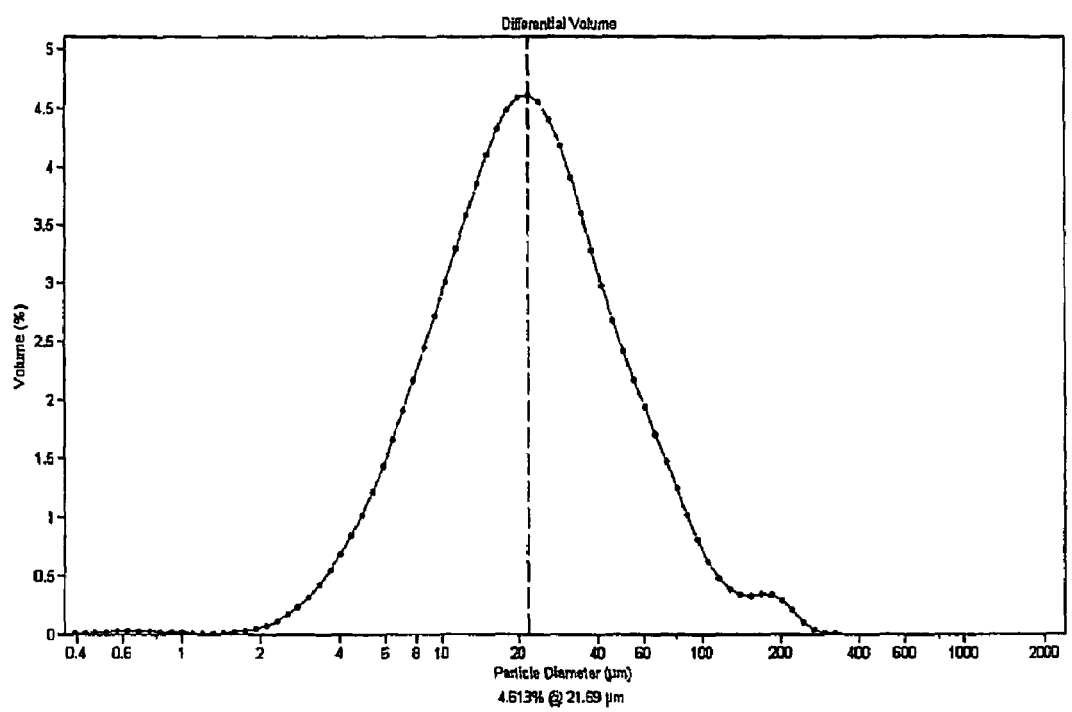
FIG. 3 shows the particle size distribution of catalyst particles according to the invention prepared in Example 5.

The catalyst composition is analyzed via elementary anlysis, the Al-content is 35%-wt., the Zr-content is 0.7%-wt. The average particle diameter (analyzed via Coulter counter) is 22 μm. The particle size distribution is shown in FIG. 3. The complex can preferably be used for the polymerisation of propene.

Example 6

Complex Preparation

The catalyst according to example 5 is prepared, except that rac-Me$_2$Si(2-Me-4-PhInd)$_2$ZrClN(Et$_2$) is used as the complex.

Starting Material

ZrCl$_4$ (available from Strem Chemicals) is reacted with LiN(Et)$_2$ (available from Aldrich, or can be prepared according to Houben-Weyl "Methoden der Organischen Chemie", Bd. 13/1, 99.Thieme, Stuttgart, 1970) in a molar ratio of ZrCl$_4$:LiN(Et)$_2$ of 1:4, resp., to prepare Zr(N(Et)$_2$)$_4$. The reaction is effected analogously to the procedure described in D. C. Bradley, I. M. Thomas *Can. J. Chem.* 40, 1962, 449-454 and D. C. Bradley, I. M. Thomas *J. Chem. Soc.,* 1960, 3857.

The obtained Zr(N(Et)$_2$)$_4$ is allowed to react with ZrCl$_4$ (in a molar ratio of 1:3) to obtain Cl$_3$ZrN(Et$_2$) (procedure analogously to method described in M. F. Lappert, G. Chandra *J. Chem. Soc. A,* 1968, 1940-1945).

Dimethylsilyl-bis(2-methyl-4-phenyl)indene (1) (available from Catalytica, or can be prepared according to procedure described i.a. in EP 790 076, Example A, steps 1-4).

Complex Formation

The Li-salt (2) of the ligand (1) was made analogously to the basic procedure descirbed i.a. in EP 790 076 (see also W. A. Herrmann, J. Rohrmann, E. Herdtweck, W. Spaleck, A. Winter *Angew. Chem.* 101, 1989, 1536 and *Angew. Chem. Int. Ed.* 28, 1989, 1511).

The reaction of the obtained Li-salt (2) with Cl3NEt2 was done twice: 1) at room temp in THF and 2) at −70 C in Et2O. In the first case a rac:meso mixture of product (3) ca. 54.5%:45.5% was obtained. In the second case, the corresponding ratio was 92%:8%. The rac-form can be separated in a conventional manner, e.g. by recrystallisation from diethylether.

Complex Characterisation

1H-NMR (270 MHz, THF-d8): 8.0-6.8 (m, 18H, arom. H), 3.00 (m, 2H, NCH2), 2.70 (m, 2H, NCH2), 2.57 (s, 3H, CH3), 2.31 (s, 3H, CH3), 1.33 (s, 3H, Si—CH3), 1.22 (s, 3H, Si—CH3), 0.50 (t, 6H, 2×CH3).

The invention claimed is:

1. A process for producing an olefin polymerization catalyst comprising an organometallic compound of a transition metal of Group 3 to 10 of the Periodic Table (IUPAC) or of an actinide or lanthanide, said process comprising
    preparing a homogeneous solution of one or more catalyst components;
    dispersing said solution in a solvent immiscible therewith to form a liquid/liquid emulsion system in which said one or more catalyst components are present in the droplets of the dispersed phase;
    solidifying said dispersed phase to convert said droplets to solid particles, wherein the solidification is effected within the droplets.

2. The process according to claim 1, wherein said homogeneous solution is formed with a solvent being an organic solvent or a mixture thereof.

3. The process according to claim 2, wherein said solvent is a linear, branched, or cyclic alkane or alkene, an aromatic hydrocarbon and/or a halogen-containing hydrocarbon, or a mixture thereof.

4. The process according to claim 1, wherein said immiscible solvent, which forms the continuous phase is an inert solvent or a mixture thereof, which does not undergo chemical reactions with any catalyst forming component or precursor thereof.

5. The process according to claim 1, wherein said immiscible solvent comprises a semi-, highly, or perfluorinated hydrocarbon, a functionalized derivative thereof, or a mixture thereof.

6. The process according to claim 5, wherein said immiscible solvent comprises a perfluorohydrocarbon or a functionalized derivative thereof or a mixture thereof.

7. The process according to claim 5, wherein said immiscible solvent comprises a C$_3$-C$_{30}$ perfluoroalkane, -alkene, or -cycloalkane, or a mixture thereof.

8. The process according to claim 5, wherein said immiscible solvent comprises a perfluorohexane, perfluoroheptane, perfluorooctane, or perfluoro (methylcyclohexane), or a mixture thereof.

9. The process according to claim 1, wherein said catalyst further comprises an activator containing aluminum or boron as said catalyst component.

10. The process according to claim 1, wherein said catalyst is formed in situ from catalyst components in said solution.

11. The process according to claim 1, further comprising an emulsifying agent, which is present during the formation of said emulsion.

12. The process according to claim 11, wherein said emulsifying agent is prepared by reacting a surfactant precursor bearing at least on functional group, with a compound reactive with said functional group in the catalyst solution or in the solvent forming the continuous phase before the addition of the organometallic compound of a transition metal of Group 3 to 10 of the Periodic Table (IUPAC) or of an actinide or lanthanide.

13. The process according to claim 11, wherein said emulsifying agent is prepared by reacting a highly fluorinated C$_{1-13}$-alcohol surfactant precursor with a cocatalyst compound.

14. The process according to claim 13, wherein said surfactant precursor is a highly fluorinated C$_{4-20}$-alcohol.

15. The process according to claim 14, wherein said highly fluorinated alcohol surfactant precursor is a highly fluorinated C$_{5-10}$-alcohol surfactant precursor.

16. The process according to claim 13, wherein said cocatalyst compound is an aluminoxane.

17. The process according to claim 1, wherein solidifying said dispersed droplets to form solid particles is effected by a temperature change treatment.

18. The process according to claim 17, wherein said temperature change treatment comprises subjecting the emulsion to gradual temperature change of up to 10° C. per minute.

19. The process according to claim 18, wherein said temperature change treatment comprises subjecting the emulsion to gradual temperature change of up to 0.5 to 6° C. per minute.

20. The process according to claim 19, wherein said temperature change treatment comprises subjecting the emulsion to gradual temperature change of up to 1 to 5° C. per minute.

21. The process according to claim 17, wherein said temperature change treatment comprises subjecting the emulsion to a temperature change of more than 40° C. within less than 10 seconds.

22. The process according to claim 21, wherein said temperature change treatment comprises subjecting the emulsion to a temperature change of more than 50° C. within less than 6 seconds.

23. The process according to claim 1, wherein the liquid/liquid emulsion system of droplets, which comprises said solution of the homogeneous catalyst, further comprises an olefinic monomer, and the solidification of the dispersed droplets to form solid particles is effected by polymerizing said olefinic monomer.

24. The process according to claim 23, wherein an olefinic monomer is employed as solvent to form the solution of the homogeneous catalyst.

25. The process according to claim 23, wherein the olefinic monomer is a gas and is added to the emulsion system to effect the prepolymerization of said monomer in the dispersed droplets.

26. The process according to claim 1, wherein the solidification of the dispersed droplets to form solid particles is effected by inducing within said dispersed droplets a chemical reaction which yields solid particles containing said catalyst.

27. The process according to claim 1, wherein the liquid/liquid emulsion system of droplets, which comprises said solution of the homogeneous catalyst, further comprises a cross-linking agent and an activator and the solidification of the dispersed droplets to form solid particles is effected by cross-linking the activator with the cross-linking agent.

28. The process according to claim 1, wherein the transition metal compound is of Group 4 to 6 of the Periodic Table (IUPAC).

29. The process according to claim 1, wherein the organometallic compound of a transition metal is a compound of formula (I):

$$(L)_m R_n MX_q \quad (I)$$

wherein M is a transition metal of group 3 to 10 of the Periodic Table (IUPAC), and each X is independently a σ-ligand, each L is independently an organic ligand which coordinates to M, R is a bridging group linking two ligands L, m is 1, 2 or 3; n is 0 or 1; q is 1, 2 or 3; and m+q is equal to the valency of the metal.

30. The process according to claim 29, wherein the organometallic compound of a transition metal is a metallocene.

31. The process according to claim 29, wherein the organometallic compound of a transition metal is a non-metallocene.

32. The process according to claim 29, wherein M is a transition metal of Group 4 to 6 of the Periodic Table (IUPAC).

33. The process according to claim 1, wherein the solid particles are recovered and subjected to washing and drying.

34. The process according to claim 33, wherein the recovered particles have an average size range of 5 to 200 μm.

35. The process according to claim 34, wherein the recovered particles have an average size range of 10 to 100 μm.

36. The catalyst according to claim 33, wherein the predetermined particles' size range is 5 to 200 μtm.

37. A process for polymerizing an olefin in the presence of a catalyst produced according to claim 1.

38. A polyolefin which is obtained by contacting an olefin polymerization catalyst prepared according to the process of claim 1 with at least one olefin that is polymerizable in a coordination polymerization reaction.

39. The method of claim 1, further comprising recovering said particles to obtain said catalyst.

40. The method of claim 39, wherein said catalyst consists of particles having a surface area of less than 30 m²/g.

41. The method of claim 40, wherein said catalyst consists of particles having a surface area of less than 20 m²/g.

42. A method of homo or copolymerizing $C_2$-$C_{10}$ alpha olefins comprising contacting the catalyst prepared according to the process of claim 1 with one or two $C_{2-C10}$ α-olefins.

43. A method of homo or copolymerizing propene or ethene α-olefines, or copolymers thereof, comprising contacting propene or ethene in the presence of the catalyst prepared according to the process of claim 1 with one or two $C_2$ to $C_{10}$ α-olefins, or copolymers thereof.

44. A method of preparing an at least two-phase emulsion system for producing olefin polymerization catalysts, comprising contacting a fluorinated organic solvent or mixtures thereof, with a solution of the catalyst components, wherein said at least two-phase emulsion system comprises continuous and dispersed phase and wherein a fluorinated organic solvent of mixtures thereof form the continuous phase of the emulsion and the solution of the catalyst component forms the dispersed phase of the emulsion.

45. A method according to claim 44, wherein said fluorinated organic solvent or mixtures thereof comprise a semi-, highly, or perfluorinated hydrocarbon, a functionalized derivative thereof, or mixtures thereof.

46. A method according to claim 44, wherein said fluorinated organic solvent of mixtures thereof comprise a perfluorohydrocarbon, a functionalized derivative thereof, or mixtures thereof.

47. A method according to claim 46, wherein said perfluorohydrocarbon is a $C_3$-$C_{30}$ perfluoroalkane, -alkene, or -cycloalkane.

48. A method according to claim 47, wherein said perfluorohydrocarbon is a $C_4$-$C_{10}$ perfluoroalkane, -alkene, or -cycloalkane.

49. A method according to claim 48, wherein said perfluorohydrocarbon is a perfluorohexane, perfluoroheptane, perfluorooctane, or perfluoro (methylcyclohexane).

50. A method according to claim 44, wherein said emulsion comprising said continuous phase and said dispersed phase is biphasic.

* * * * *